Sept. 12, 1950  S. C. NIELSEN  2,521,992
METHOD OF ORNAMENTING RUBBER SHEETING
Filed June 3, 1947

INVENTOR
SYDNEY CARL NIELSEN
BY Otto Munk
HIS ATTY

Patented Sept. 12, 1950

2,521,992

UNITED STATES PATENT OFFICE 2,521,992

METHOD OF ORNAMENTING RUBBER SHEETING

Sydney C. Nielsen, Melbourne, Victoria, Australia

Application June 3, 1947, Serial No. 752,043
In Australia November 25, 1946

7 Claims. (Cl. 154—99)

This invention relates to surface ornamented rubber sheeting and the method of manufacturing same.

The object of the invention is to provide rubber sheeting having surface ornamentation resembling inlaid work applied during the vulcanization or curing of the sheeting so that it becomes permanently embedded or bound into its surface.

According to the invention, shaped pieces of cured or partly cured rubber or like material are applied to the surface of the sheeting in the pattern or design required while said sheeting is in the uncured state, and the sheeting and applied pattern pieces then subjected to a vulcanizing process whereby the pieces are pressed into the sheeting and permanently bound or vulcanized therein.

The pattern pieces are applied to the sheeting by means of a transfer sheet upon which the pieces are first assembled in the pattern or design required. Said transfer sheet may be superimposed on the sheeting and pass through the vulcanizing process, being subsequently stripped from the sheeting after the pattern pieces have been vulcanized into the latter. Alternatively, the transfer sheet may be brought into contact with the sheeting to transfer the pattern pieces thereto and be stripped from the sheeting before it passes through the vulcanizing process.

Accurate and expeditious assembly of the pattern pieces on the transfer sheet is obtained by printing the pattern or appropriate locating marks on the transfer sheet. This also enables unskilled labor to be used in the assembly of the pattern pieces and effects economies in production costs.

The invention is more fully described by reference to the accompanying drawings wherein.

In these views, 1 indicates the basic rubber sheeting and 2 the shaped pattern pieces permanently vulcanized into its upper surface 3.

Figure 3:
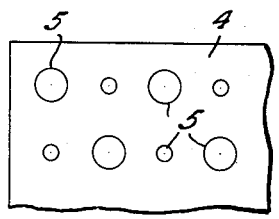
Fig. 3 is a plan view of a portion of the printed transfer sheet used in the invention.
Figure 4:
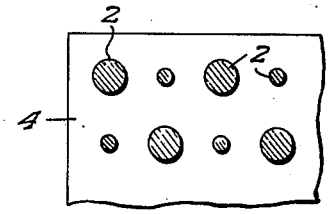
Fig. 4 is a similar view to Fig. 3, but showing the shaped pattern pieces attached to the transfer sheet.

The pattern pieces are cut from sheets of cured or partly cured rubber and are first assembled on the transfer sheet 4 shown in Fig. 3 in the pattern or design required and preferably adhesively attached thereto. The transfer sheet is preferably printed as at 5 with the pattern or design to be produced or with suitable locating marks to facilitate accurate and expeditious assembly of the pattern pieces 2. Fig. 3 shows the printed transfer sheet and Fig. 4 the pattern pieces 2 assembled thereon.

The transfer sheet carrying the pattern pieces 2 is then applied to the rubber sheeting to transfer the pattern pieces thereto.

Figure 1:
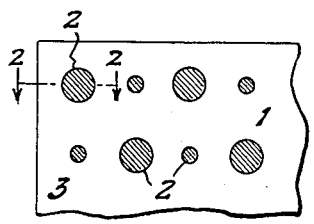
Fig. 1 is a plan view of a portion of the improved ornamented rubber sheeting according to the invention.
Figure 2:
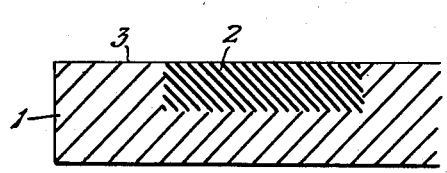
Fig. 2 is a cross-section on an enlarged scale taken on the line 2—2 of Fig. 1.
Figure 5:
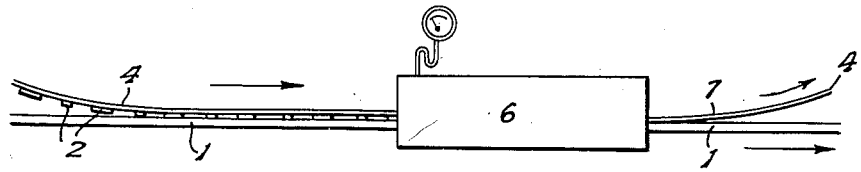
Fig. 5 is a diagrammatic view showing the transfer sheet superimposed on the rubber sheeting and passing through the vulcanizing process.

As shown in Fig. 5, the transfer sheet is superimposed on the rubber sheeting and passes with said sheeting through the vulcanizer indicated by 6. Under the heat and pressure of the vulcanizing process, the pattern pieces 2 are pressed into the surface 3 of the sheeting and permanently bound or vulcanized therein as shown in Fig. 2 with their upper surfaces exposed to form the pattern or design.

On the completion of the vulcanizing process, the transfer sheet 4 is readily stripped from the sheeting as indicated at 7 and may be re-used.

Figure 6:
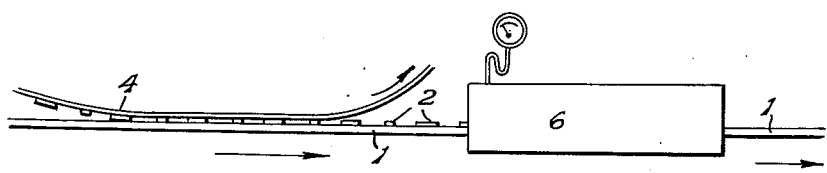
Fig. 6 is a similar view to Fig. 5, but showing the transfer sheet being stripped from the rubber sheeting before it passes to the vulcanizing process.

In the alternative arrangement shown in Fig. 6 the transfer sheet 4 carrying the pattern pieces 2 is brought into contact with the sheeting 1 to transfer the pieces 2 thereto and is stripped therefrom prior to the sheeting entering the vulcanizer 6. In this arrrangement, the pattern pieces 2 are carried into the vulcanizer on the sheeting and pressed into and permanently vulcanized into the upper surface of the sheeting in the same manner as previously described by the heat and pressure of the vulcanizing process.

The pattern pieces 2 may be of any approved shape and size and may also be prepared in various colors to produce desired colored patterns or designs.

The transfer sheet 4 may be made from paper, linen or like material, while the vulcanizer 6 may be of any approved type.

Ornamented sheeting as described may be used for flooring, lining or other uses. It can also be cut into squares or sections for use as tiles or the like. The sheeting will be found very attractive in appearance and can be produced at low cost in comparison with hand made inlaid sheeting. The use of the printed transfer sheet 4 renders this possible as the shaped pattern pieces can be quickly and accurately assembled or positioned on said transfer sheet by unskilled labor.

What I claim is:

1. The method of ornamenting rubber sheeting by the application thereto of a design resembling inlaid ornamentation, which comprises: forming the design to be applied to said rubber sheeting on a transfer sheet of flexible material different from said rubber sheeting by adhesively fixing on the surface of said transfer sheet a plurality of pattern pieces of partly cured rubber, said pattern pieces being colored and arranged to form on said transfer sheet the design which it is desired to apply to said rubber sheeting; superposing said transfer sheet on said rubber sheeting with said pattern pieces of partly cured rubber in contact with the surface of said rubber sheeting which is to be ornamented; and pressing said pattern pieces against the surface of said rubber sheet, while simultaneously vulcanizing said sheet and said pattern pieces, whereby said pattern pieces are pressed into and form the desired ornamental design on said rubber sheeting.

2. The method of ornamenting rubber sheeting by the application thereto of a design resembling inlaid ornamentation, which comprises: forming the design to be applied to said rubber sheeting on a paper transfer sheet by adhesively fixing on the surface of said transfer sheet a plurality of pattern pieces of partly cured rubber, said pattern pieces being colored and arranged to form on said transfer sheet the design which it is desired to apply to said rubber sheeting; superposing said transfer sheet on said rubber sheeting with said pattern pieces of partly cured rubber in contact with the surface of said rubber sheeting which is to be ornamented; and pressing said pattern pieces against the surface of said rubber sheeting, while simultaneously vulcanizing said sheet and said pattern pieces, whereby said pattern pieces are pressed into and form the desired ornamental design on said rubber sheeting.

3. The method of ornamenting rubber sheeting by the application thereto of a design resembling inlaid ornamentation, which comprises: forming the design to be applied to said rubber sheeting on a transfer sheet of linen by adhesively fixing on the surface of said linen transfer sheet a plurality of pattern pieces of partly cured rubber, said pattern pieces being colored and arranged to form on said transfer sheet the design which it is desired to apply to said rubber sheeting; superposing said transfer sheet on said rubber sheeting with said pattern pieces of partly cured rubber in contact with the surface of said rubber sheeting which is to be ornamented; and pressing said pattern pieces against the surface of said rubber sheet, while simultaneously vulcanizing said sheet and said pattern pieces, whereby said pattern pieces are pressed into and form the desired ornamental design on said rubber sheeting.

4. The method of ornamenting rubber sheeting by the application thereto of a design resembling inlaid ornamentation, which comprises: forming the design to be applied to said rubber sheeting on a transfer sheet of flexible material different from said rubber sheeting, said transfer sheet having been previously printed with indicia thereon to facilitate accurate assembly of said design on said transfer sheet, by adhesively fixing on the surface of said transfer sheet a plurality of pattern pieces of partly cured rubber, said pattern pieces being colored and arranged to form on said transfer sheet the design which it is desired to apply to said rubber sheeting; superposing said transfer sheet on said rubber sheeting with said pattern pieces of partly cured rubber in contact with the surface of said rubber sheeting which is to be ornamented; and pressing said pattern pieces against the surface of said rubber sheet, while simultaneously vulcanizing said sheet and said pattern pieces, whereby said pattern pieces are pressed into and form the desired ornamental design on said rubber sheeting.

5. The method of ornamenting rubber sheeting by the application thereto of a design resembling inlaid ornamentation, which comprises: forming the design to be applied to said rubber sheeting on a transfer sheet of flexible material different from said rubber sheeting by adhesively fixing on the surface of said transfer sheet a plurality of pattern pieces of partly cured rubber, said pattern pieces being colored and arranged to form on said transfer sheet the design which it is desired to apply to said rubber sheeting; superposing said transfer sheet on said rubber sheeting with said pattern pieces of partly cured rubber in contact with the surface of said rubber sheeting which is to be ornamented; stripping off said transfer sheet from said rubber sheeting, while leaving said plurality of pattern pieces in place on said rubber sheeting; and pressing said pattern pieces against the surface of said rubber sheeting, while simultaneously vulcanizing said sheet and said pattern pieces, whereby said pattern pieces are pressed into and form the desired ornamental design on said rubber sheeting.

6. The method of ornamenting rubber sheeting by the application thereto of a design resembling inlaid ornamentation, which comprises: forming the design to be applied to said rubber sheeting on a transfer sheet of flexible material different from said rubber sheeting by adhesively fixing on the surface of said transfer sheet a plurality of pattern pieces of partly cured rubber, said pattern pieces being colored and arranged to form on said transfer sheet the design which it is desired to apply to said rubber sheeting; superposing said transfer sheet on said rubber sheeting with said pattern pieces of partly cured rubber in contact with the surface of said rubber sheeting which is to be ornamented; pressing said pattern pieces against the surface of said rubber sheet, while simultaneously vulcanizing said sheet and said pattern pieces, whereby said pattern pieces are pressed into and form the desired ornamental design on said rubber sheeting; and stripping said transfer sheet from said ornamented rubber sheeting.

7. The method of ornamenting rubber sheeting by the application thereto of a design resembling inlaid ornamentation, which comprises: forming the design to be applied to said rubber sheeting on a paper transfer sheet which has previously been printed with indicia thereon to facilitate accurate assembly of said design on said transfer sheet by adhesively fixing on the surface of said paper transfer sheet a plurality of pieces of partly cured rubber, said pattern pieces being colored and arranged to form on said transfer sheet the design which it is desired to apply to said rubber sheeting; superposing said paper transfer sheet on said rubber sheeting with said pattern pieces of partly cured rubber in contact with the surface of said rubber sheeting which is to be ornamented; pressing said pattern pieces against the surface of said rubber sheet, while simultaneously vulcanizing said sheet and said pattern pieces, whereby said pattern pieces are pressed into and form the desired ornamental design on said rubber sheeting; and stripping said paper transfer sheet from said ornamented rubber sheeting.

SYDNEY C. NIELSEN.

REFERENCES CITED

The following references are of record in the file of this patent:

UNITED STATES PATENTS

| Number | Name | Date |
| --- | --- | --- |
| 1,170,154 | Hennig | Feb. 1, 1916 |
| 1,496,753 | Burkley | June 3, 1924 |
| 1,597,602 | Klein | Aug. 24, 1926 |
| 1,989,702 | Leguillon | Feb. 5, 1935 |
| 2,316,149 | Bates | Apr. 13, 1943 |

FOREIGN PATENTS

| Number | Country | Date |
| --- | --- | --- |
| 408,562 | Great Britain | July 19, 1932 |